Jan. 12, 1943.   F. W. CLEGG   2,308,155
FOLDING OF SHEETS SUCH AS TABLECLOTHS AND THE LIKE
Filed June 21, 1940   9 Sheets-Sheet 2
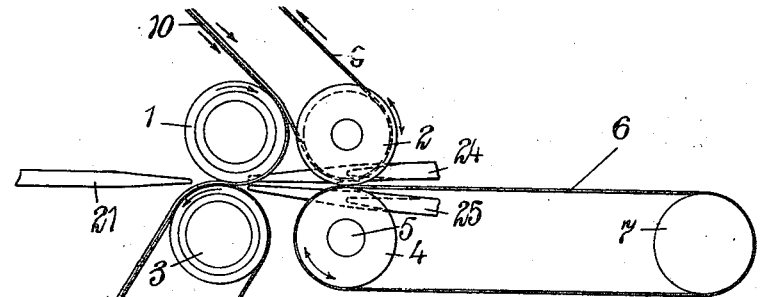
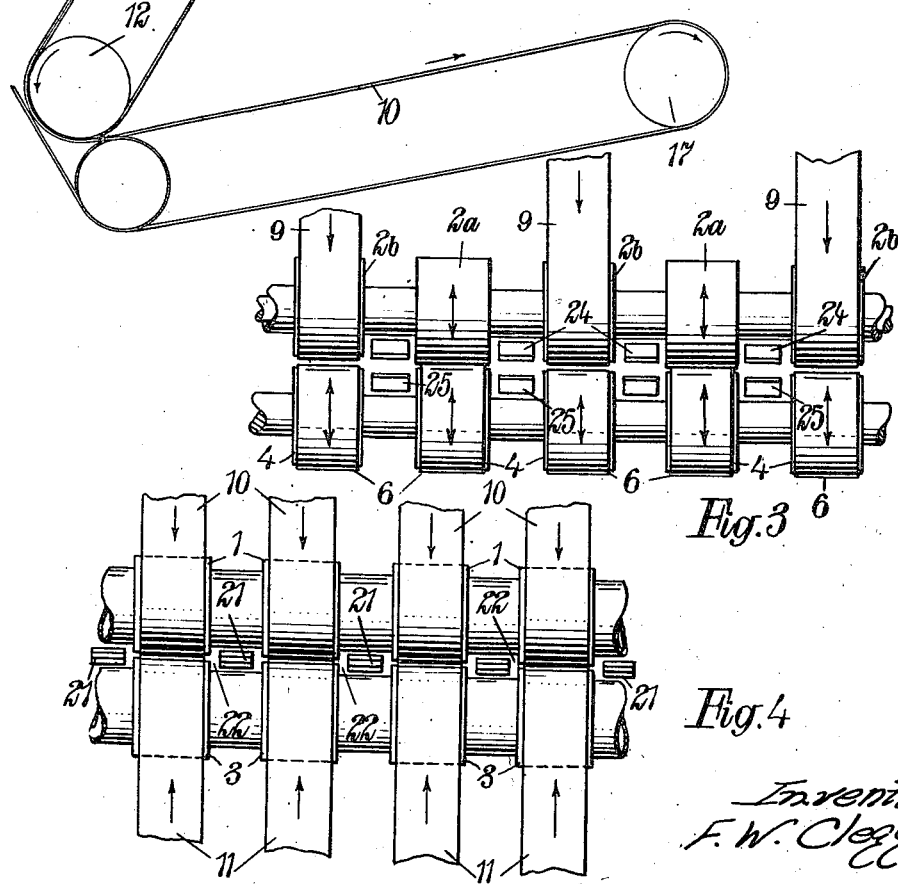
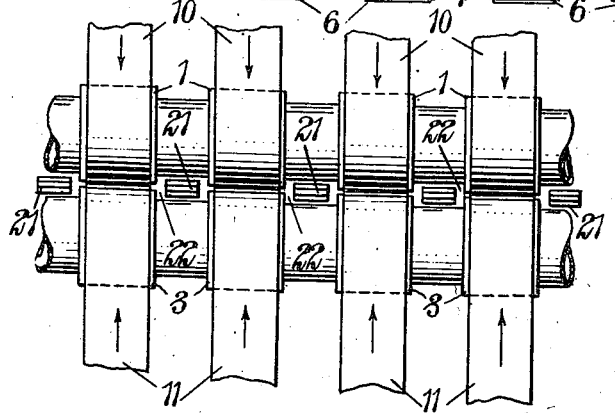

Jan. 12, 1943.                F. W. CLEGG                2,308,155
            FOLDING OF SHEETS SUCH AS TABLECLOTHS AND THE LIKE
                    Filed June 21, 1940         9 Sheets-Sheet 3
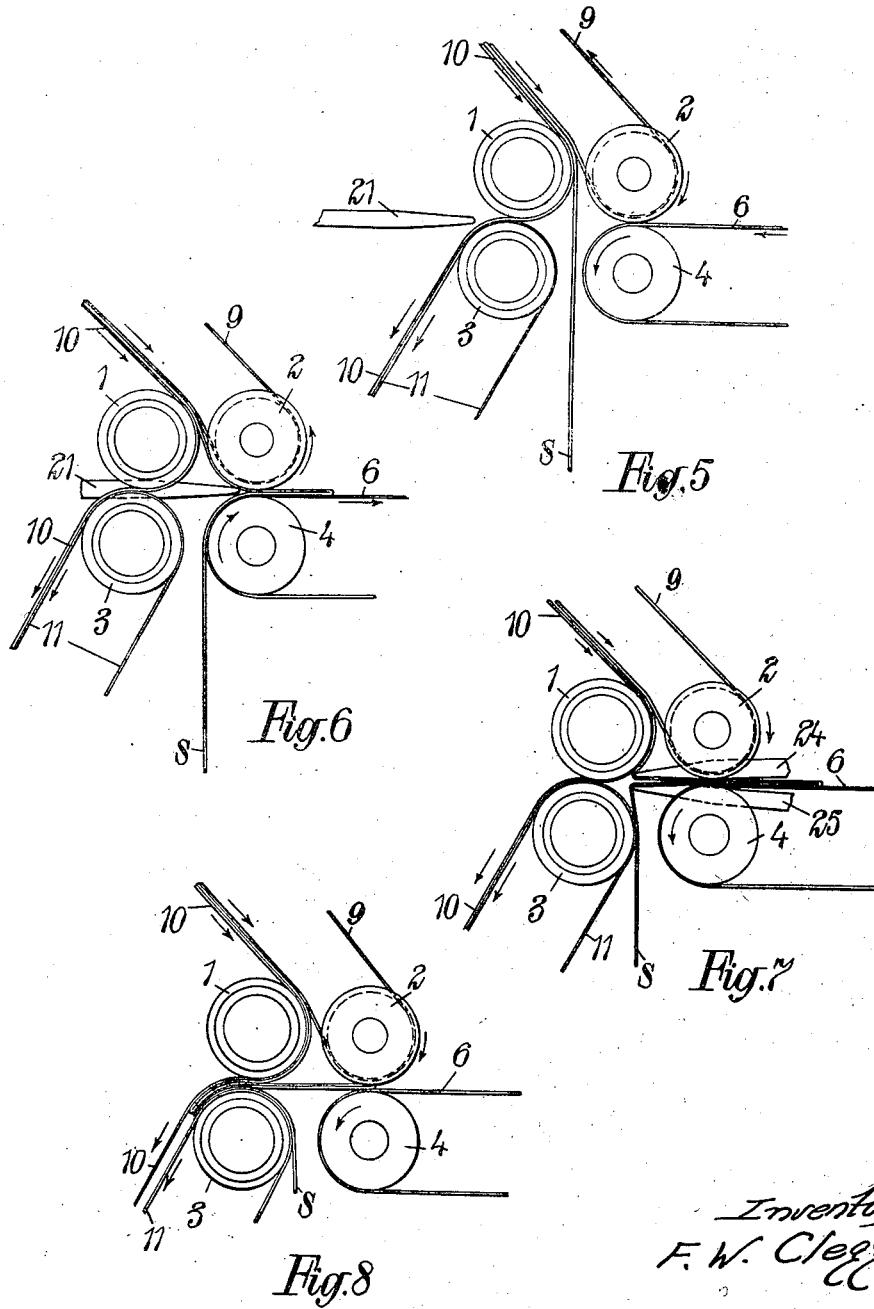

Jan. 12, 1943. F. W. CLEGG 2,308,155
FOLDING OF SHEETS SUCH AS TABLECLOTHS AND THE LIKE
Filed June 21, 1940 9 Sheets-Sheet 5

Inventor,
F. W. Clegg
By: George B Willcox
Attys.

Jan. 12, 1943.  F. W. CLEGG  2,308,155
FOLDING OF SHEETS SUCH AS TABLECLOTHS AND THE LIKE
Filed June 21, 1940  9 Sheets-Sheet 6

Inventor,
F. W. Clegg
By: George W. Willcox
Atty.

Jan. 12, 1943.  F. W. CLEGG  2,308,155
FOLDING OF SHEETS SUCH AS TABLECLOTHS AND THE LIKE
Filed June 21, 1940   9 Sheets-Sheet 7

Inventor,
F. W. Clegg
By George W. Willcox
Atty.

Jan. 12, 1943.    F. W. CLEGG    2,308,155
FOLDING OF SHEETS SUCH AS TABLECLOTHS AND THE LIKE
Filed June 21, 1940    9 Sheets-Sheet 8
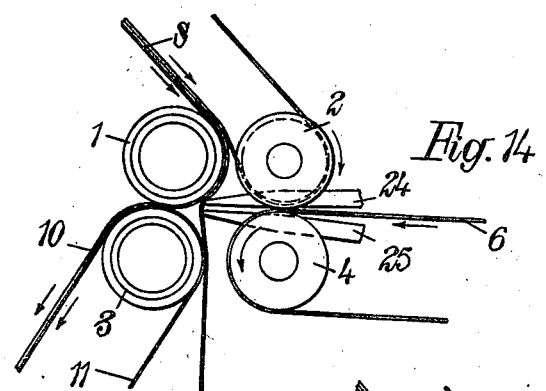
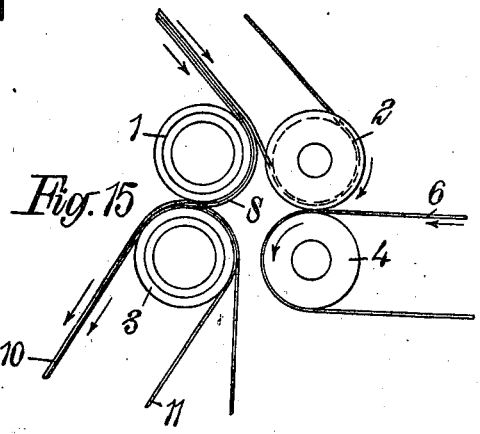
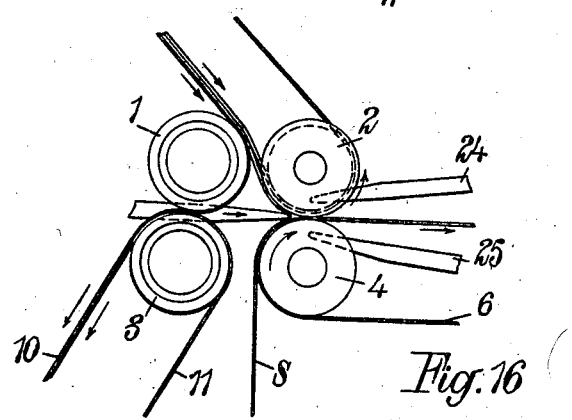
Inventor,
F. W. Clegg
By George B. Willcox
Atty Jan. 12, 1943.  F. W. CLEGG  2,308,155
FOLDING OF SHEETS SUCH AS TABLECLOTHS AND THE LIKE
Filed June 21, 1940  9 Sheets-Sheet 9
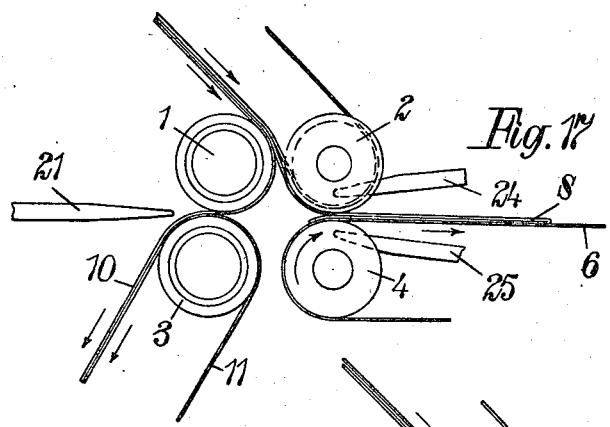
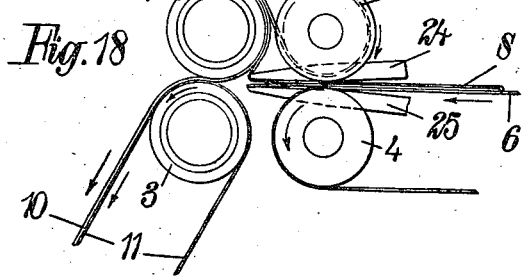
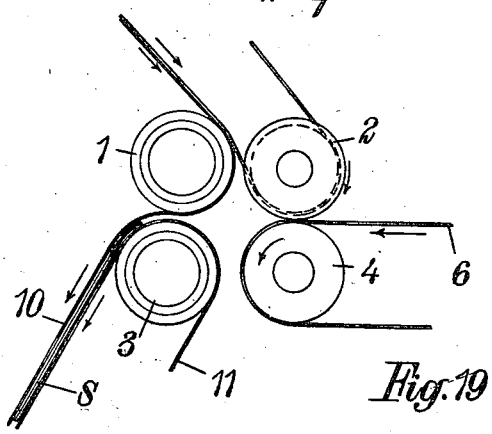
Inventor,
F. W. Clegg Patented Jan. 12, 1943

2,308,155

UNITED STATES PATENT OFFICE 2,308,155

FOLDING OF SHEETS SUCH AS TABLECLOTHS AND THE LIKE

Frederick William Clegg, Peterborough, England, assignor to Baker Perkins Limited, Peterborough, England Application June 21, 1940, Serial No. 341,599½
In Great Britain July 1, 1939

13 Claims. (Cl. 270—84)

This invention relates to the folding of sheets, tablecloths, towels or like flat goods (hereinafter referred to as sheets) after such are delivered from laundry ironing machines and particularly wherein the sheet is provided with a first half-way fold and a second fold which brings the area of the article to a quarter its original area, the folds being on parallel lines.

The invention is concerned more particularly with folding machines or mechanism wherein a folding knife or element is adapted to engage the sheet at a predetermined position and feed it into the bight of folding bands, tapes or the like.

In previous proposals for the folding of sheets or like articles adapted to be folded to quarter size the second fold was so arranged that the outer areas or sections of the sheet were both located on the same side of the first folded sections, resulting in a nested U formation. This has the result that when the sheet is unfolded and laid flat the outer creases corresponding to the quarter and three-quarter dimension point in opposite directions, thus providing an upstanding ridge and one projecting downwardly.

When articles such as tablecloths are folded by hand the outer areas of the folded article are arranged to lie on opposite sides of the first fold so that in section the article is in the nature of a closed M so that when unfolded the outer creases both point in the same direction and opposite to the inner or half-way crease and the cloth will lie evenly.

An object of the present invention is to provide an improved method of and means for folding articles such as sheets, tablecloths and the like whereby the folding simulates that obtained by a hand fold as above referred to.

According to the invention, in the folding of sheets to quarter size the first fold is formed by passing the inner areas of the sheet between folding means to bring said areas into folded relation about a half-way line, and reversing the direction of movement of said folded part while causing the outer areas of the sheet to move into position on either side of the already folded part whereby the folded sheet in section is in the nature of a closed M.

The invention also comprises sheet folding mechanism having a reciprocable folding element operable from one side of the sheet, and a pair of folding elements operable from the other side of the sheet, said pair of folding elements being located in planes disposed on either side of the plane of the first element.

The invention also consists in mechanism for folding sheets comprising a reciprocating folding element adapted to engage the sheet at a predetermined position and feed it between pressure means to produce the first fold, and a pair of reciprocating folding elements arranged in planes on either side of the plane of the first element and adapted to engage the article at predetermined points and feed it in the reverse direction to pressure means to produce the second fold.

The invention also comprises sheet folding mechanism comprising endless travelling tapes wherein the tapes associated with the first folding operation are arranged to have their motion reversed during the second folding operation whereby the folded portion of the sheet is moved in a direction opposite to that taken in forming the first fold.

The invention also consists in sheet folding mechanism having a pair of co-operating roll members each provided with spaced roller elements on which travelling tapes are mounted and folding elements each comprising tongues adapted to pass through the spaces between the roller elements.

The invention further consists in a sheet folding machine comprising upper and lower roll members adapted to form the first fold and adjacent upper and lower roll members adapted to form the second fold, said members having spaced roller elements on which travelling tapes are seated, and folding elements located exterior to both pairs of members and comprising tongues arranged to pass through the spaces of one pair of roll members in feeding the sheet to the bight of the other pair of roll members.

In the accompanying drawings:

Figure 2 is a side view of the parts adjacent the folding position.

Figure 3 is a partial end view of the first fold means.

Figure 4 is a partial end view of the final fold means.

Figures 5 to 8 are diagrams showing the various positions in the folding of a sheet.

Figures 14 and 15 are diagrams illustrating the adaptation of the machine for folding in halves only, and Figures 16 to 19 are diagrams illustrating the adaptation of the machine for folding into thirds.

Figure 1:
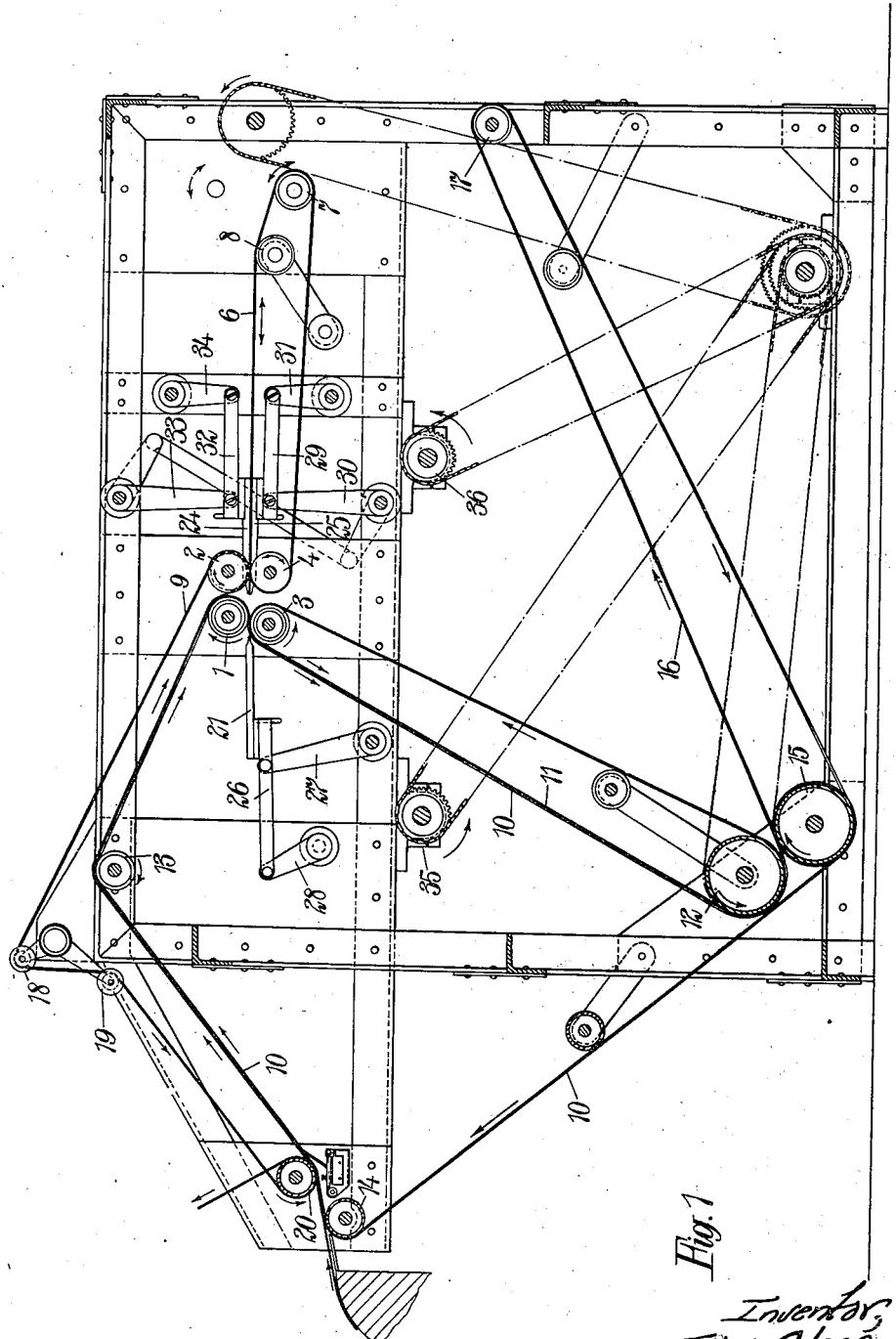
Figure 1 is a side view of a sheet folding machine according to the invention.
Figure 9:
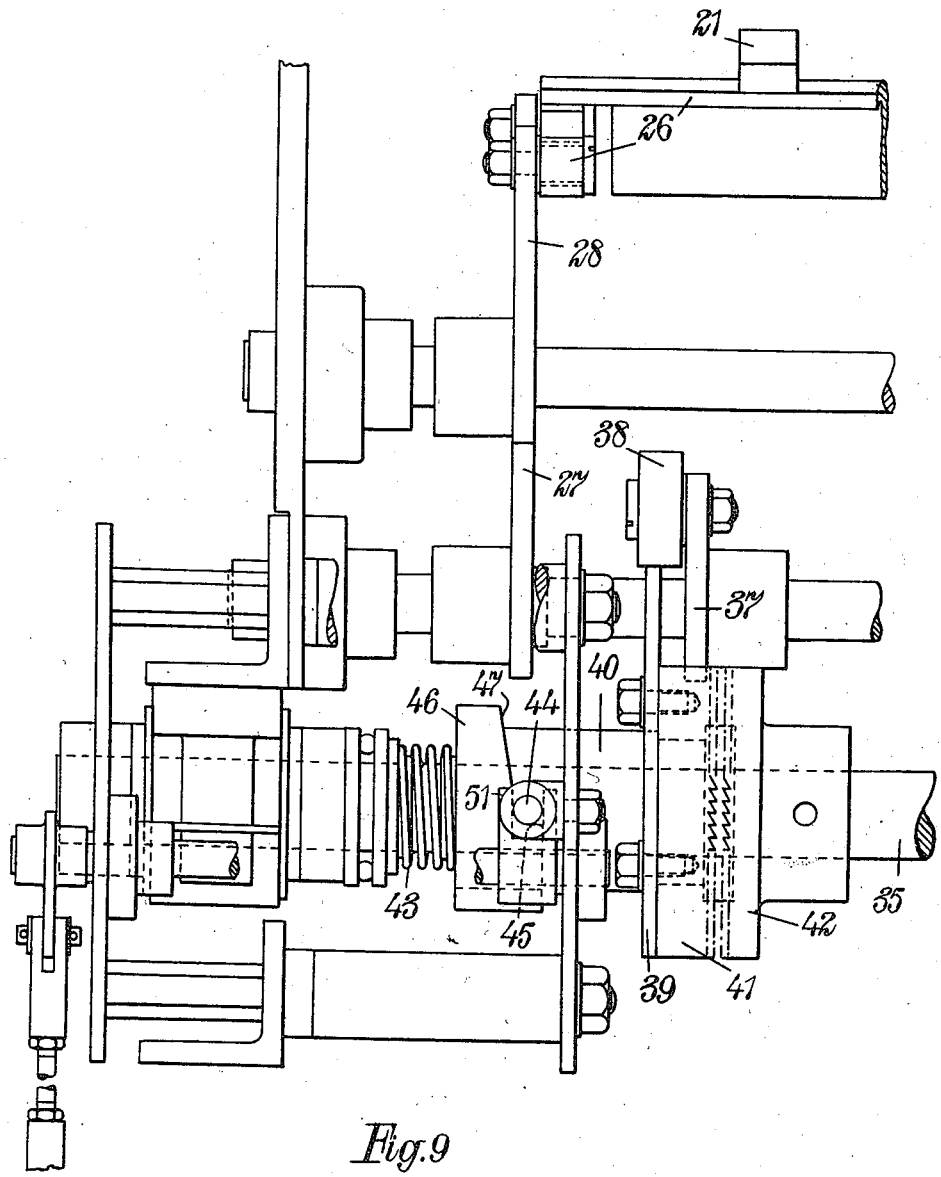
Figures 9 and 10 are end and side views of the mechanism for operating the first folder.
Figure 10:
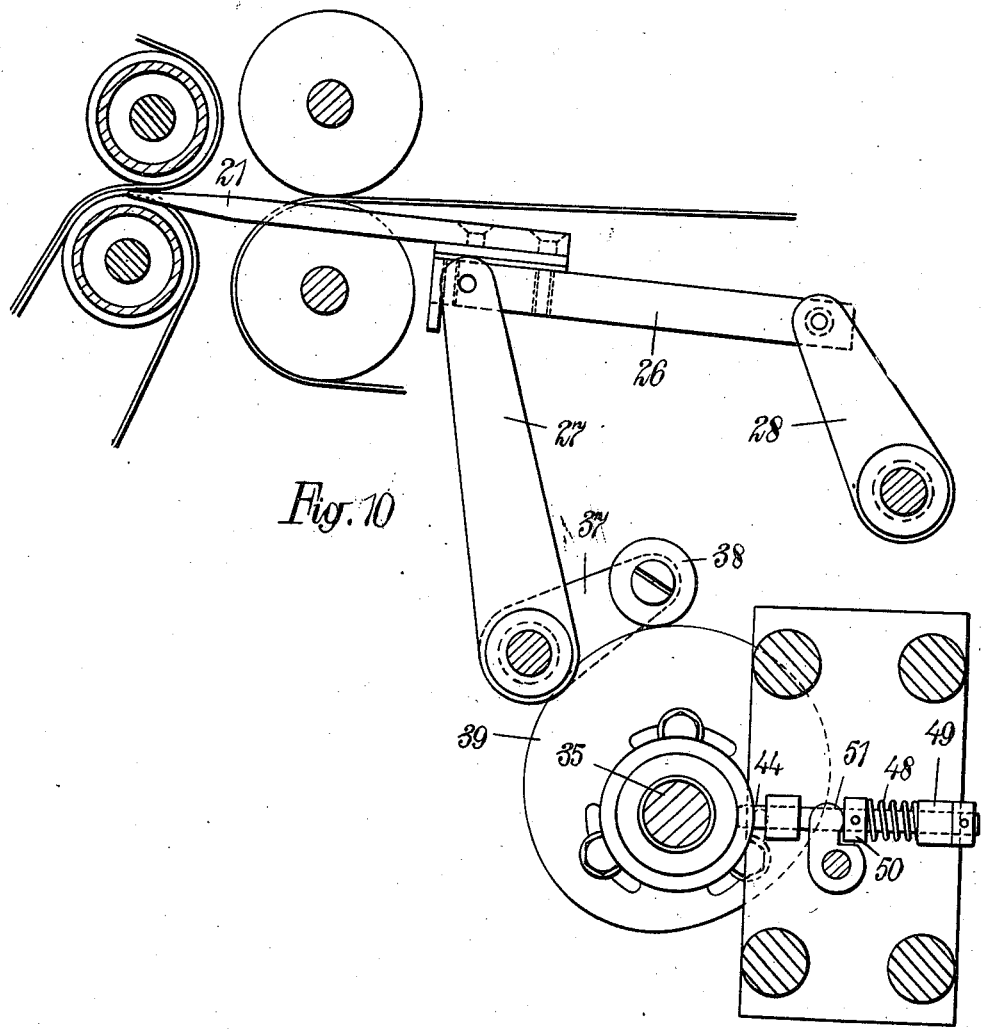
Figure 11:
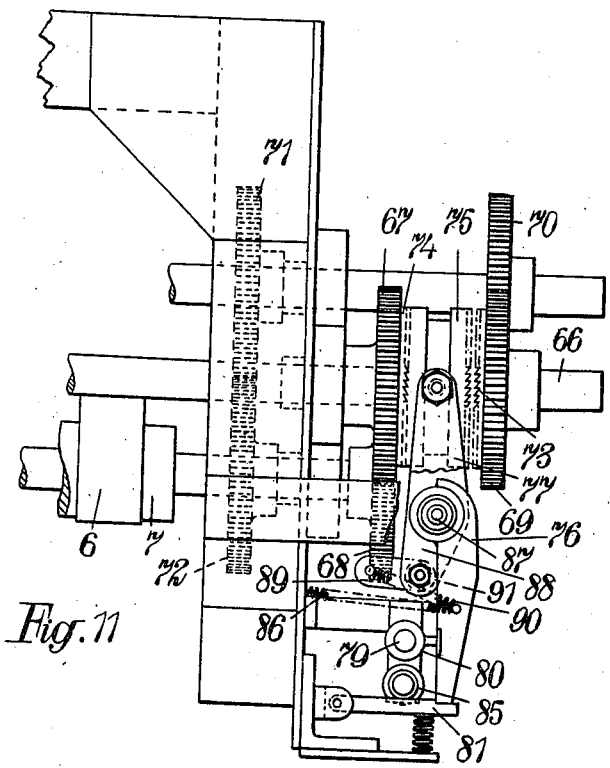
Figures 11, 12 and 13 are end and side views and partial plan of the means for controlling the direction of movement of the supporting bands associated with the first fold.
Figures 12, 13:
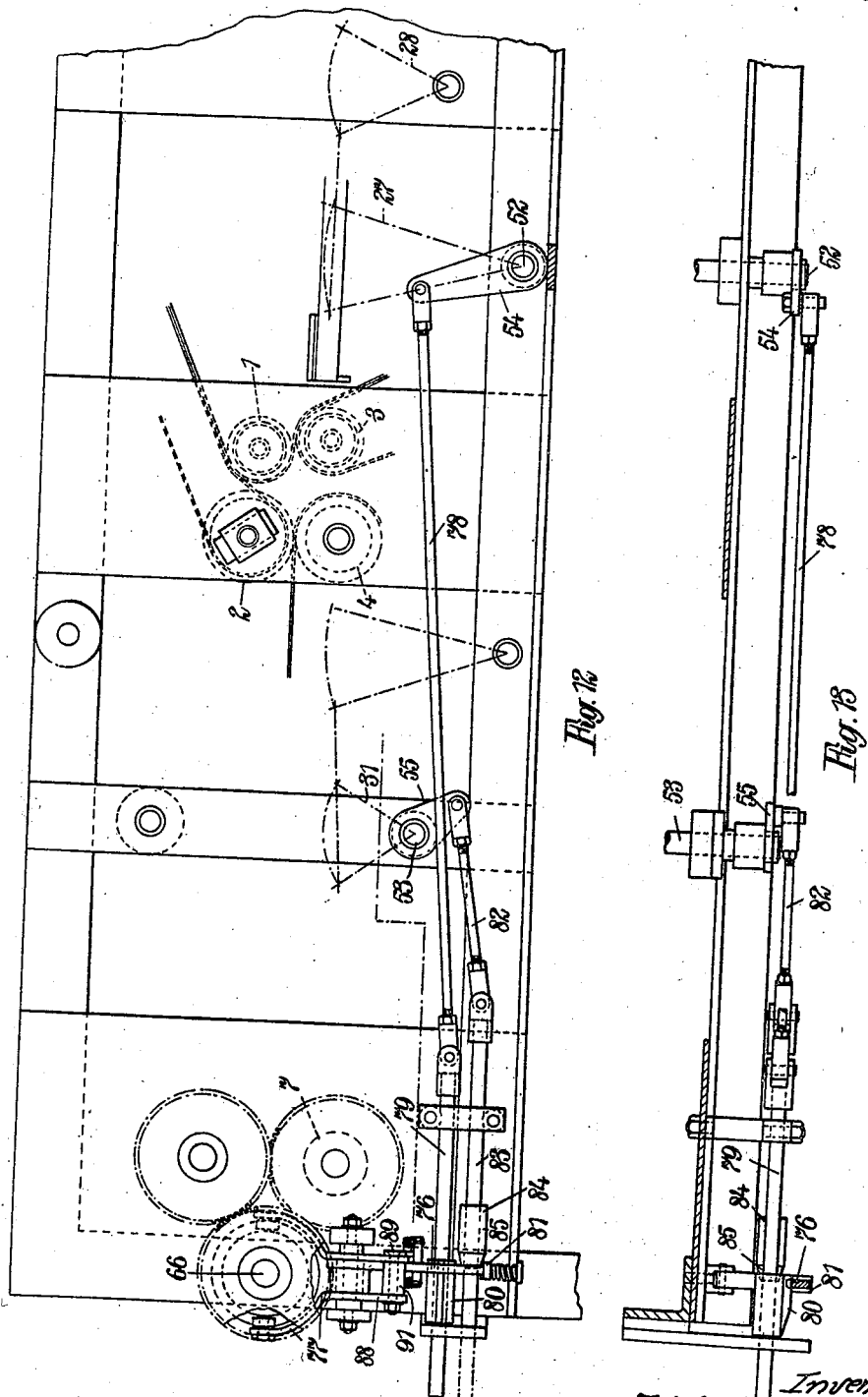

In carrying the invention into effect according to one convenient mode a folding machine is provided which is located adjacent the delivery end of a laundry ironing machine so that the articles as delivered from the ironer pass directly into the folding machine. The folding machine is provided with two sets of folding means each comprising upper and lower roll members 1, 2 and 3, 4 respectively. These sets of roll members 1, 3 and 2, 4 are disposed adjacent to one another and the sheet S is adapted to be fed downwardly between the roll members so that it lies freely in the space between the sets of roll members. The roll members 2 and 4 associated with the first fold are arranged to the right of the other pair 1 and 3 and the lower roll members 4 comprise a series of spaced roller elements 4 mounted upon a shaft 5, the shaft being located in end bearings so as to rotate freely therein.

On the roller elements 4 endless travelling bands or tapes 6 are seated which extend to the right and pass around a driving roll 7 adapted to be driven in a manner hereinafter referred to.

Conveniently a third guide roll 8 (Figure 1) is mounted to engage the upper laps of the tapes 6 in the vicinity of the driving roll 7 so that the portion of the laps between the third roll 8 and the lower folding roll member 4 is substantially horizontal.

The upper roll member 2 of the first pair is also provided with spaced roller elements, alternate ones 2a of which engage alternate bands or tapes 6 on the lower roll member 4. These alternate roller elements 2a are free to rotate by contact with the band or tape 7 with which they engage. The other roller elements 2b upon the upper roll member 2 form terminal rolls for an upper set of endless feeding tapes 9 and the diameter of the roller elements 2b is such that the feeding tapes 9 are spaced from the lower folding tapes 6 above which the terminal roller elements are mounted.

The left-hand pair of upper and lower roll members 1 and 3 associated with the second fold are also formed with spaced roller elements upon which endless travelling main tapes 10 and 11 are seated.

The tapes 11 associated with the lower roll 3 extend downwardly and to the left and pass around a driving roll 12. These tapes form one set of the final fold tapes and co-operate with a second set of tapes 10 which pass around the roller elements of the upper roll member, thence around an elevated guide roll 13 and down to a second guide roll 14. From the second guide roll 14 the tapes 10 extend downwardly past the driving roll 12 associated with the second folding tapes and around a further driving roll 15 adjacent thereto. After passing around this further driving roll 15 the tapes pass around the second fold driving roll 12 and co-operate with the upper laps of the second fold tapes 11 thereon and pass back to the top roll member 1 of the left-hand pair of roll members.

A set of delivery tapes 16 is provided adapted to receive the finished folded articles and these are arranged around the lowest driving roll 15 and pass thence in any suitable direction around roll 17.

The laps of the main set of tapes 10 which extend over the elevated guide roll 13 form a feeding lap and co-operate with main feed tapes 9 which are referred to above as passing around the terminal point formed by the upper roller element 2 of the first folders. The feeding tapes 9 have a lap co-operating with the feeding lap of the main tapes 10 so that sheets pass between such laps and are fed to the folding station. These feed tapes 9 pass around guide rolls 18, 19, 20 of which 20 co-operates with the before-mentioned guide roll 14 adjacent the feeding position so that a bight is formed into which the sheets or other articles pass into the tapes.

Associated with the first folder roll members is a folding blade or comb device 21 which is mounted so as to reciprocate in an approximately horizontal plane and is normally located exteriorly of the second folder roll members 1 and 3. The fingers or teeth of this folding blade or comb are adapted to pass through the spaces 22 formed by the second folder roller elements 1 and 3 and to engage a sheet hanging freely in the space between the first and second set of roll members whereby the sheet will be fed or pushed into the bight of the first pair of folder roll members 2 and 4. This folder is adapted to produce the first fold.

The second or final fold is produced by a pair of similar folder blades or comb devices 24, 25 which are normally located to the right of the first folder roll members 2 and 4, the fingers or teeth of the blades being adapted to pass through the spaces 26 between the roller elements thereon and to engage the partly folded sheet and deliver it into the second folder roll members 1 and 3.

The first folding operation is adapted to cause the inner areas of the article to be fed between the folder roll members 2 and 4 so that the folded part will lie upon the horizontal endless travelling tapes 6 which pass around the lower rolls 4. When the second folding operation is to be effected the blades 24, 25 of the pair of folding elements are located respectively above and below the partly folded sheet so that in their operation they will engage the sheet in planes above and below the plane of the first folder blade.

During the operation of the first folder 21 and the formation of the first fold the horizontal tapes 6 which support the folded part move to the right as viewed in Figure 2, that is in the direction of the operative movement of the folder element, while during the second fold the tapes 6 are adapted to move in a reverse direction so as to convey the partly folded sheet in accordance with the desired movement.

Prior to the first fold operation, however, these supporting tapes 6 are adapted to move in the opposite direction to that required by such fold, i. e. to the left as viewed in Figure 2. This is done to facilitate the passage of the leading end of the sheet as it will be appreciated that should such end engage the tapes it will be caused to move downwardly and thus avoid the leading end being inadvertently drawn into the bight should the tapes be moving in the other direction.

The reversal of the direction of movement of these supporting tapes 6 is controlled by the movements of the folder blades by mechanism hereinafter referred to.

The folder blades 21 are carried upon a reciprocable bar or plate 26 which is mounted upon pivotal levers or links 27, 28, the axes of which are located below the plane of the folder. Similarly the lower blades 25 of the second folder are carried by a reciprocable bar or plate 29 mounted upon pivoted levers or links 30, 31, while the upper blades 24 are carried by a bar or plate 32 suspended by pivoted levers or links 33, 34.

The links are preferably of different lengths, the longer link being nearer to the folding position, so that the ends of the blades move in the desired path.

The reciprocation of the folder blades is effected by rotary cams which are conveniently arranged below the folders, there being a cam shaft 35 for the first folder and a second cam shaft 36 for the second pair of folder blades. In the case of the second folder blades the links 30 and 33 are suitably connected whereby both blades are operated simultaneously from the same cam.

The time of the operation of the folder blades is controlled by a suitable timing device which may be of any convenient construction, the setting of which may be controlled by the passage of the leading and trailing edges of the article, such control being preferably of an electro-mechanical nature and through the medium of a control switch arranged adjacent the guide roll 20 where the leading edge of the sheet first enters the feeding tapes 10 and 19.

A convenient form of timing device is described in concurrent application No. 341,600½.

The means for reciprocating the first folder blade will now be described. On the longer link 27 supporting the reciprocating bar 26 which carries the folder blades an arm 37 is provided having a roller 38 in engagement with the rotary cam 39, one revolution of which is adapted to oscillate the arm and link whereby the folder is given the desired movement and returned to its normal position. The cam is mounted upon a sleeve 40 which is adapted to ride freely on the shaft 35 which is driven from a convenient part of the machine. The cam 39 has attached to it a clutch part 41, adapted for co-operating with a complementary clutch part 42 secured to the shaft 35. The movement of the cam clutch part 41 into engagement with the shaft clutch part 42 is effected by means of a spring 43, the operation of which, however, is prevented normally by a stop or finger 44 which projects into the path of a shoulder 45 on a collar 46 on the cam sleeve 40. This finger 44 is adapted to be removed by a trip lever which lies in the path of a rotary timing element. When the finger 44 is withdrawn the spring 43 moves the cam clutch 41 into engagement with the shaft clutch part 42 whereby the cam is rotated.

After its release by the timing element the finger 44 is adapted to ride upon the surface of the collar 46 until it reaches a recessed part where it again projects into its initial inward position. The collar 46 is provided with a face cam 47 opposed to the spring 43 which during the continued rotation and toward the end of the revolution of the rotary cam engages the now forwardly projected finger 44 whereby the rotary cam clutch part 41 is moved out of engagement with the shaft clutch part 42 as the parts assume their original position.

The stop finger 44 is held in its engaging position by means of a spring 48 located between a fixed part 49 and a collar 50 on the finger. This collar is adapted for engagement by a detent 51 which is associated with the trip lever above mentioned. The return of the folder blade is effected by spring means which hold the roll on to the rotary cam.

The second folders are operated in a similar manner from the cam on the second cam shaft 36, it being appreciated that the cams will be brought into operation at the appropriate time through the timing mechanism.

The reversal of the direction of the supporting tapes 6 associated with the first folder mechanism is controlled from the folder blade mechanism. Thus the longer supporting link 27 of the first folder and a short link 31 of the second folder are mounted upon rock shafts 52, 53 to which levers 54, 55 are secured and such levers are linked to mechanism for controlling the reversal of the drive.

The driving roll 7 for the supporting tapes 6 is driven alternately through two trains of gearing from the driven shaft 66, viz. spur gears 67, 68 or 69, 70, 71, 72. The gears 67 and 69 are adapted to be driven from either of two clutch elements 73, 74. These clutches are located on either side of a common or intermediate clutch part 75 keyed to the driven shaft 66.

The intermediate clutch part 75 is adapted to be reciprocated into either the forward or reverse clutch elements 73, 74 by means of a pivoted lever 76 having a yoke piece 77, engaging a groove in the part 75. The lever 76 is controlled by the linkage from the folder elements above mentioned.

Normally the intermediate clutch element 75 is in engagement with the second folder clutch element 73 so that the drive takes place through the train 69, 70, 71, 72 and the supporting laps of the tapes 6 move toward the sheet. Upon the first folder 21 being actuated, the linkage above referred to and comprising the rod 78, bar 79 and arm 54 causes a reciprocating cam element 80 to engage the pivoted lever 76 carrying the yoke piece 77 whereby the intermediate clutch part 75 is removed from the second folder clutch part 73 and brought into engagement with the first folder clutch part 74 and the drive now takes place through the gears 67, 68. The lever 76 is held in this position by means of a spring catch 81 which engages its lower end. This change over of the clutches causes a reversal of direction of travel of the supporting tapes 6 so that they now accord with the movement of the folder blade.

When the first folder 21 reverses its movement the reciprocating cam element 80 associated therewith is withdrawn from the clutch lever 76. The clutch 75, 73, however, is retained in its position by the catch 81 so that the supporting tapes 6 continue their folding movement.

When the second folder 24, 25 is brought into operation the linkage associated therewith and comprising rod 82, bar 83 and arm 55 causes the reciprocation of an element 84 having a coned end 85 which engages the spring catch 81 and removes it from the tail of the clutch lever 76 so that the intermediate clutch element 75 by means of a returning spring 86 is again brought into engagement with the second folder clutch 73 so that the first folder supporting tapes 6 have their travel reversed to agree with the reverse feeding movement of the folded part of the sheet while the second fold is taking place.

In order to ensure a smooth engagement of the clutches the lever 76 and yoke piece 77 comprise separate parts pivoted together at 87, i. e., the pivotal axes of the lever. The yoke piece is provided with arms 88 to which an extension 89 is secured. A spring 90 is provided between the extension and the lever 76. A stop against which the lever 76 abuts under the action of the spring 90 is provided by a distance piece 91 between the arms 88 of the yoke piece.

Relative movement between the yoke piece 77 and lever 76 during engaging of the clutches 74, 75 is taken up by the spring 90. During engaging of the clutches 75, 73 the pivotal action of the lever is effected by the returning spring 86 so that no relative movement is necessary.

While the invention has been particularly described in connection with the folding of sheets or other flat goods into closed M formation, the machine may be adapted for folding into halves or thirds by appropriate timing control and the provision of means for disconnecting certain parts to render them non-operative.

Thus in folding a sheet into halves the folder 21 is disconnected and when a half of the sheet has passed the folding position and hangs between the rolls 1, 2, 3, 4, the folders 24, 25 are operated to guide the sheet into the bight between the rolls 1 and 3 and between the tapes 10 and 11 as indicated in Figures 14 and 15.

For folding into thirds, see Figures 16–19, the folder 21 is operated when a third of the sheet has passed the folding position. This fold takes place between the rolls 2 and 4, the tapes 6 travelling in the appropriate direction.

When two-thirds of the sheet have passed the folding position, the folders 24, 25 are actuated, the upper folder 24 engaging the sheet at the two-thirds position while the lower folder 25 acts to support the free edge of the lower section of the sheet and lead it into the bight between the rolls 1 and 3. When folding into thirds no adjustments of the machine are necessary apart from the timing.

I claim:

1. In the folding of sheets or other flat goods to quarter size on parallel fold lines, passing the inner areas of the sheet between folding means to bring said areas into folded relation about a half way fold line, and reversing the direction of said folded part while bringing the outer areas of the sheet into folded relation on either side of said folded part about one quarter and three quarters fold lines respectively.

2. A machine for folding sheets or other flat goods to quarter size on parallel fold lines, comprising a reciprocable folding element operable from one side to engage the sheet at half way fold line to produce the first fold, and a pair of reciprocable folding elements operable from the other side of the sheet to engage the sheet at one quarter and three quarter fold lines respectively to produce the second fold, said pair of folding elements being located in horizontal planes on either side of the plane of the first folding element and means for feeding the sheet downwardly between said reciprocable folding elements.

3. A machine for folding sheets or other flat goods into quarter size on parallel fold lines, comprising a reciprocable folding element adapted to engage the sheet at a halfway fold line, and feed it between pressure means to produce the first fold, and a pair of reciprocable folding elements arranged in planes on either side of the plane of the first element and adapted to engage the partly folded sheet at one quarter and three quarter fold lines respectively and feed it in the reverse direction to pressure means to produce the second fold.

4. A machine for folding sheets or other flat goods to quarter size on parallel fold lines by two operations, comprising endless travelling tapes for supporting the sheet during folding, wherein the tapes associated with the first folding operation are arranged to have their motion reversed during the second folding operation whereby the first folded portion of the sheet is moved in a direction opposite to that taken in forming the first fold.

5. A machine for folding sheets or other flat goods, comprising co-operating roll members adapted to form a first fold, adjacent co-operating roll members adapted to form a second fold, said roll members comprising spaced roller elements on which travelling conveying tapes are seated, and reciprocable folding elements located exterior to both sets of roll members, said folding elements comprising tongues arranged to pass through the spaces of one set of roll members in feeding the sheet to the bight of the other set of roll members.

6. A machine as claimed in claim 5, wherein the sets of co-operating roll members comprise upper and lower roll members, the sheet being fed downwards between said sets for engagement by the folding elements which reciprocate horizontally.

7. A machine as claimed in claim 5, wherein the sets of co-operating roll members comprise upper and lower roll members, the sheet being fed downwards between said sets for engagement by the folding elements which reciprocate horizontally, and wherein the lower roll member of the set for forming the first fold is provided with endless travelling tapes for supporting the first folded section, said tapes being driven by reversing gear whereby the direction of travel is reversed during the second fold operation.

8. A machine as claimed in claim 5, wherein the sets of co-operating roll members comprise upper and lower roll members, the sheet being fed downwards between said sets for engagement by the folding elements which reciprocate horizontally, and wherein the lower roll member of the set for forming the first fold comprises a series of spaced roller elements and the co-operating roll member comprises a corresponding series of spaced roll elements, endless travelling tapes seated on the lower roller elements, means for reversing the direction of travel of said tapes, alternate roll elements of the upper roll member engaging said tapes while the other elements are spaced from the corresponding tapes.

9. A machine as claimed in claim 5, wherein the sets of co-operating roll members comprise upper and lower roll members, the sheet being fed downwards between said sets for engagement by the folding elements which reciprocate horizontally, and wherein the lower roll member of the set forming the first fold is provided with endless travelling tapes for supporting the first folded section, the travel of said tapes being reversible by a drive from one or other of a pair of gear trains, one gear in each train being clutchable to a drive shaft under the control of means coupled to the folding elements.

10. A machine as claimed in claim 5, wherein the sets of co-operating roll members comprise upper and lower roll members, the sheet being fed downwards between said sets for engagement by the folding elements which reciprocate horizontally, and wherein the folding elements are reciprocated by rotary cams under the control of a timing device.

11. A machine as claimed in claim 5, wherein the sets of co-operating roll members comprise upper and lower roll members, the sheet being fed downwards between said sets for engagement by the folding elements which reciprocate horizontally, and wherein the folding elements are reciprocated by rotary cams which are freely mounted upon driven shafts and are axially slidable thereon by springs for clutching to the respective shafts, the cams being normally held out of engagement by pins displaceable by trigger means actuated by a timing device.

12. A machine as claimed in claim 5, wherein the sets of co-operating roll members comprise upper and lower roll members, the sheet being fed downwards between said sets for engagement by the folding elements which reciprocate horizontally, and wherein the folding elements are reciprocated by rotary cams which are freely mounted upon driven shafts and are axially slidable thereon by springs for clutching to the respective shafts, the cams being normally held out of engagement by pins displaceable by trigger means actuated by a timing device, the operation of which is controlled by the passage of the sheets through the machine.

13. A machine as claimed in claim 5, wherein the sets of co-operating roll members comprise upper and lower roll members, the sheet being fed downwards between said sets for engagement by the folding elements which reciprocate horizontally, and wherein the folding elements are reciprocated by rotary cams which are freely mounted upon driven shafts and are axially slidable thereon by springs for clutching to the respective shafts, the cams being normally held out of engagement by pins displaceable by trigger means actuated by a timing device, the operation of which is controlled in accordance with the length of the sheet by electro-mechanical means the actuation of which is dependent upon the actuation of a switch by the leading and trailing edges of the sheet.

FREDERICK WILLIAM CLEGG.